United States Patent [19]
Paiss et al.

[11] Patent Number: 5,487,129
[45] Date of Patent: Jan. 23, 1996

[54] SPEECH PATTERN MATCHING IN NON-WHITE NOISE

[75] Inventors: Omri Paiss, Tel Aviv; Ilan D. Shallom, Ashdod; Felix Flomen, Rishon Lezion; Raziel Haimi-Cohen, Jerusalem, all of Israel

[73] Assignee: The DSP Group, San Jose, Calif.

[21] Appl. No.: 190,087

[22] PCT Filed: Jul. 30, 1992

[86] PCT No.: PCT/US92/06351
§ 371 Date: Jun. 13, 1994
§ 102(e) Date: Jun. 13, 1994

[87] PCT Pub. No.: WO93/03480
PCT Pub. Date: Feb. 18, 1993

[30] Foreign Application Priority Data

Aug. 1, 1991 [IL] Israel ............................................. 99041

[51] Int. Cl.⁶ ........................................................... G10L 9/00
[52] U.S. Cl. ........................... 395/2.42; 395/2.4; 395/2.31
[58] Field of Search ............................... 381/45; 395/2.31, 395/2.44, 2.35–2.37, 2.3, 2.4

[56] References Cited

U.S. PATENT DOCUMENTS 5,046,099  9/1991  Nishimura .............................. 395/2.31
5,319,736  6/1994  Hunt ....................................... 395/2.36

*Primary Examiner*—Allen R. MacDonald
*Assistant Examiner*—Michelle Doerrler
*Attorney, Agent, or Firm*—Ladas & Parry

[57] ABSTRACT

A system for matching an input signal, comprising non-white noise and a patterned signal corrupted by said non-white noise, to a plurality of reference signals, the system including an estimator estimating noise features of said non-white noise and producing from the noise features at least one noise whitening filter; a filter generally simultaneously filtering the input signal and the plurality of reference signals using the noise whitening filter and producing a filtered input signal, having a white noise component, and a plurality of filtered reference signals; and a pattern matcher generally robust to white noise for matching the filtered input signal to one of the filtered reference signals.

33 Claims, 2 Drawing Sheets

1

SPEECH PATTERN MATCHING IN NON-WHITE NOISE

FIELD OF THE INVENTION

The present invention relates generally to pattern matching in noisy environments and to speech pattern matching in noisy environments in particular.

DESCRIPTION OF THE PRIOR ART

Speech pattern matching is a known process in which an incoming test speech segment, such as a speech utterance, is compared to a collection of reference speech segments in order to find the reference speech segment in the collection that is most similar to the test speech segment. Similarity is defined by a score given to each reference segment with respect to the input test speech segment. The reference and test speech segments can each be represented by a set of features or by a model.

In the speech recognition task, the reference and test speech segments are uttered words and the collection of reference segments, known as templates, constitutes a predefined dictionary. In the speaker identification task, the reference segments are representative of voices of different people. In speech coding, such as through Vector Quantization (VQ), the test and reference segments are usually arbitrarily short segments and the VQ method represents each test segment by the index of the reference segment which is closest to it.

The matching capability of conventional algorithms deteriorates greatly in the presence of noise in the input speech. One approach to solving this problem is by speech enhancement preprocessing, a process which is reviewed in the book *Speech Enhancement*, edited by J. S. Lim, and published by Prentice-Hall, New-York, 1983. Application of such methods to speech recognition in a noisy environment in a car is described in the article by N. Dal Degan and C. Prati, "Acoustic Noise Analysis and Speech Enhancement Techniques for Mobile Radio Applications", *Signal Processing*, Vol. 15, pp. 43–56, 1988.

Some methods have been described which perform speech matching in a white noise environment for the purpose of speech recognition. Among them are the Short-time Modified Coherence (SMC) representation of speech, as described by D. Mansour and B. H. Juang, in their article, "The Short-Time Modified Coherence Representation and Noisy Speech Recognition", *IEEE Transactions on Acoustics, Speech and Signal Processing*, Vol. ASSP-37, pp. 795–804, June 1989.

Other methods use noise robust distortion measures, such as a projection distortion measure or a Weighted Likelihood Ratio (WLR). Methods using the projection distortion method are discussed in the article by D. Mansour and B. H. Juang, "A Family of Distortion Measures Based Upon Projection Operation for Robust Speech Recognition", *IEEE Transactions on Acoustics, Speech and Signal Processing*, Vol. ASSP-37, pp. 1659–1671, November 1989.

Unfortunately, the abovementioned methods fail when the noise is colored, as in the environment of a driving car.

Y. Ephraim, J. G. Wilpon and L. R. Rabiner, in the article, "A Linear Predictive Front-end Processor for Speech Recognition in Noisy Environments", *International Conference on Acoustics, Speech and Signal Processing*, ICASSP-87, pp. 1324—1327, Dallas Tex., 1987, present a method for speech recognition suitable for colored noise. In this method, the power spectrum of the noise is used, in an iterative algorithm, to estimate the Linear Prediction Coefficients (LPC) of clean speech from its noisy version. This algorithm requires extensive computations.

This last method and the SMC method were applied to speech recognition in car noise by I. Lecomte, M. Lever, J. Boudy and A. Tassy. Their results are discussed in the article, "Car Noise Processing for Speech Input", *International Conference on Acoustics, Speech and Signal Processing*, ICASSP-89, pp. 512–515. Glasgow UK, 1989.

SUMMARY OF THE INVENTION

It is an object of the present invention to overcome the problems of the prior art and to provide a pattern matching system which is operative in the presence of colored and quasi-stationary noise and which is computationally efficient. The present invention may be used, for example, for speech recognition, speaker identification and verification, or vector quantization (VQ) for speech coding.

The system includes the following three operations:

1) Noise modeling: Noise is collected from a noisy input test signal in the intervals containing no speech. The features of the noise are extracted and are used to construct a noise whitening filter for whitening the noise.

2) Pre-Processing: The noisy input test signal and a plurality of reference template signals, each containing a previously stored reference speech signal which can be accompanied by noise, are filtered through the noise whitening filter. This produces modified test and reference signals wherein the noise component of the test signal is white. It also ensures that the test and reference template signals are modified in identical ways.

3) Matching: A pattern matching algorithm which is operative in white noise is applied to the modified test and reference template signals. This operation involves scoring the similarity between the modified test signal and each of the modified reference templates, followed by deciding which reference template is most similar to the test signal, The present invention can be applied, among others, to the following problems of speech processing in colored noise:

a) Speech recognition using Dynamic Time Warping (DTW) in the presence of colored noise, such as is found in the environment of a car.

b) Vector quantization (VQ) of noisy speech.

c) Speech recognition using Hidden Markov Models (HMM) with a discrete or semi-continuous probability distribution and using VQ.

d) Speaker identification or verification using DTW or HMM.

e) Speech compression through Vector Quantization of the LPC coefficients or other characteristic features of the test utterance.

In accordance with the present invention there is provided a system for matching an input signal, including non-white noise and a patterned signal corrupted by the non-white noise, to a plurality of reference signals, the system including means for estimating noise features of the non-white noise and for producing from the features at least one noise whitening filter, filter means for filtering the input signal and the plurality of reference signals using the at least one noise whitening filter and producing a filtered input signal, having a white noise component, and a plurality of filtered reference signals and pattern matching means generally robust to white noise for matching the filtered input signal to one of the filtered reference signals. In the system thus provided the at least one noise whitening filter is two noise whitening filters respectively for filtering the input signal and the reference signals which system also includes means for extracting features of the input signal and the reference signals and wherein the filter means operate in a feature domain. A feature domain of the input signal is different than a feature domain of the reference signals. The pattern matching means perform a pattern matching technique selected from the group of DTW, HMM, or DTW-VQ. The input signal is a speech signal.

In the system thus provided, the feature domains are selected from the group of data samples, Linear Prediction Coefficients, cepstral coefficients, power spectrum samples, and filter bank energies and the means for estimating estimate a filter in accordance with the selected feature domain.

Also in accordance with the present invention there is provided a speech recognition system for recognizing words found in a speech signal corrupted by non-white noise including means for estimating noise features of the non-white noise and for producing from the features at least one noise whitening filter, filter means for filtering the speech signal and a plurality of reference signals of selected spoken words, the filter means using the at least one noise whitening filter and producing a filtered speech signal and a plurality of filtered reference signals and pattern matching means generally robust to white noise for matching the filtered speech signal to one of the filtered reference signals thereby recognizing the word in the speech signal.

Further provided in accordance with the present invention is a Vector Quantization (VQ) system for vector quantizing a speech signal corrupted by non-white noise into a sequence of symbols, the system including means for estimating noise features of the non-white noise and for producing from the features at least one noise whitening filter, filter means for filtering segments of the speech signal and a plurality of numbered reference signals of selected speech segments, the filter means using the at least one noise whitening filter and producing filtered speech segments and a plurality of filtered reference segments and pattern matching means generally robust to white noise for matching each of the filtered speech segments to one of the filtered reference segments and for providing as an output a symbol which is an index of the matched reference segment.

In yet another embodiment of the present invention there is provided a speech recognition system for recognizing a word found in a speech signal corrupted by non-white noise including a vector quantization system according to claim 10 producing vector quantized speech and word matching means receiving a plurality of reference sequences of symbols relating to the reference signals and a test sequence of symbols relating to the speech signal for matching the test sequence to the reference sequences thereby to recognize the word in the speech signal. The word matching means performs Dynamic Time Warping (DTW) on the vector quantized speech and Hidden Markov Modeling (HMM).

In accordance with a further embodiment of the present invention there is provided a speaker recognition system using any of the systems described above wherein the reference signals include one word spoken by a plurality of different speakers.

Additionally in accordance with an embodiment of the present invention there is provided a speaker verification system using any of the systems described above wherein the reference signals include at least one word spoken by one speaker.

The non-white noise is the noise from the environment of a movable vehicle or, alternatively, the noise from the environment of a moving airplane cockpit or a vibrating machine.

In accordance with the present invention there is described a method for matching an input signal employing the system as described above.

BRIEF DESCRIPTION OF THE DRAWINGS

The present invention will be understood and appreciated more fully from the following detailed description taken in conjunction with the drawings in which.

DESCRIPTION OF THE PREFERRED EMBODIMENTS

Figure 1:
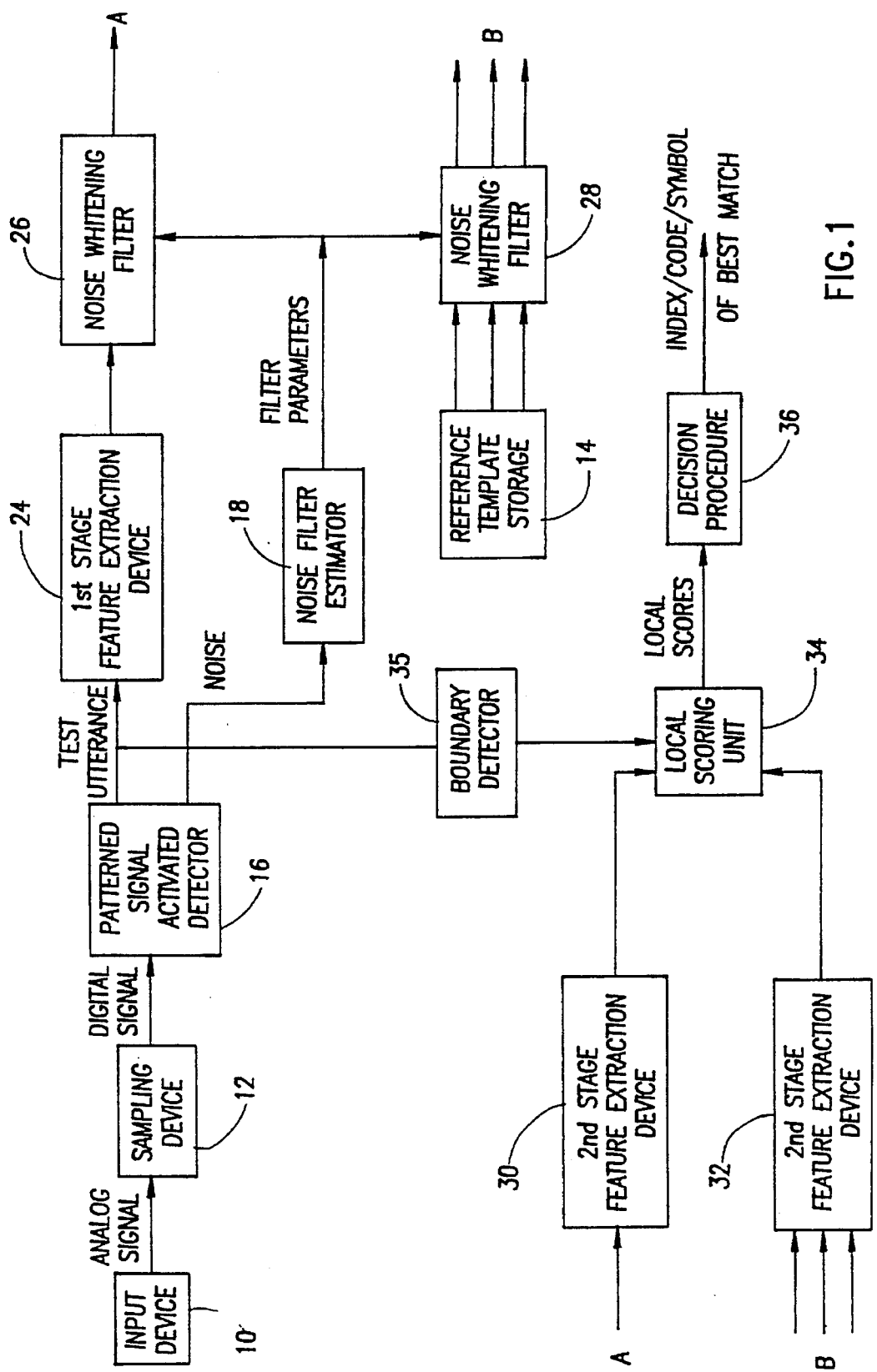
FIG. 1 is a schematic block diagram illustration of a pattern matching system constructed and operated in accordance with a preferred embodiment of the present invention.

Reference is now made to FIG. 1 which illustrates a schematic block diagram of a pattern matching system constructed and operative in accordance with the principles of the present invention.

The following discussion will present an embodiment of the present invention for matching patterned signals which are speech signals. It will be understood that this is for clarity of discussion only; the present invention is operative for all types of patterned signals accompanied by colored noise.

The pattern matching system of the present invention typically includes an input device 10, such as a microphone or similar device, for providing an analog signal, and a sampling device 12 for converting the analog signal to a digital signal. The samples of the digital signal are typically grouped into frames, typically of 128 or 256 samples each.

The digital and analog signals typically include portions containing only background noise which is typically non-white, such as colored or quasi-stationary noise, and some portions containing a signal whose pattern is to be detected, known herein as a "patterned signal". In the case of speech systems, the patterned signal is the speech signal.

The patterned signal is typically corrupted by the colored noise. The present invention seeks to match the patterned signal to a plurality of previously stored reference signals wherein the patterned signal is received in the presence of the colored noise.

The reference signals are stored as reference templates including feature sets of the reference signals extracted via feature extraction devices not shown. The reference templates are typically stored in a reference template storage device 14, such as any suitable memory device, during a process called training (not shown). These templates are representative of various patterned signals to which it is desired to match the input patterned signal. For example, the reference templates might be feature sets of uttered words (for speech recognition) or of utterances of various speakers (for speaker recognition or verification). The reference templates might also be centroids of speech segments (for speech coding using VQ analysis).

The digital signal is supplied to a patterned signal activated detection device 16 which generally detects the presence or absence of the patterned signal. For speech signals, the device 16 typically is a voice activated switch (VOX) such as described in U.S. Pat. No. 4,959,865 to Stettiner et al. U.S. Pat. No. 4,959,865 is incorporated herein by reference. The output of the device 16 are two signals, a noise signal and a "test utterance" including the patterned signal corrupted by colored noise. For the present invention, the VOX typically does not have to be precise.

The remainder of the present invention will be described for speech signals, as an example only. It will be appreciated that the present invention is operative for other types of patterned signals also.

The noise signal is provided to a noise filter estimator 18, described in more detail hereinbelow, for estimating parameters of a noise whitening filter. The noise whitening filter can convert the colored noise signal into a white noise signal.

The noise whitening filter thus estimated is used to filter both the test utterance and the reference templates, as described in more detail hereinbelow.

The test utterance is provided to a first stage feature extraction device 24 which transforms the test utterance into a sequence of test feature parameter vectors which can be any of several types of desired features, such as power spectrum samples, autocorrelation coefficients, LPC, cepstral coefficients, filter bank energies or other features characteristic of the power spectrum of the test utterance.

Suitable feature extraction devices 24 are described in the book, *Speech Communication—Human and Machine* by Douglas O'Shaughnessy, published by Addison-Wesley of Reading, Mass. in 1987, which book is incorporated herein by reference.

It will be noted that there is one feature vector per frame of the test utterance and one feature vector per frame of each reference template.

The chosen feature type is chosen by a system designer and typically depends on the pattern matching task required, the speed necessary for the task and the hardware available to perform the task. Since all of the abovementioned feature types contain basically the same information, any of them can be utilized.

For speech or speaker recognition tasks, each feature vector preferably contains the features of one speech frame of approximately 30 msec. An overlap of typically 50% may be applied between adjacent speech frames.

The test vector is provided to a noise whitening filter 26, whose parameters are estimated by filter estimator 18, for filtering the test vector so as to provide a filtered test vector in the presence of approximately white, rather than colored, noise. In this manner, known methods of matching test vectors to reference templates, which are operative only for vectors corrupted by white noise, can be used.

As is known in the art, filters affect all of the vector being filtered and not just the components of the vector which it is desired to be filtered. Thus, the output of the noise whitening filter is a test vector in the presence of white noise whose speech component is different than that off the original test vector.

Therefore, in accordance with a preferred embodiment of the present invention and in order to preserve the matching between the test vector and the reference templates, the entirety of reference templates from the reference template storage device 14 are filtered by a noise whitening filter 28 which is generally identical to noise whitening-filter 26. In this manner, the reference templates to which the test vector is to be matched are adjusted in the same manner as the test vector.

The reference templates are typically defined in the same feature set as the test vector. If so, noise whitening filter 28 is identical to noise whitening filter 26. If not, filter 28 is defined differently than the filter 26 although both filters have an equivalent effect.

The noise whitening filters 26 and 28 are calculated as follows. The parameters of each filter are such that the power spectrum of its impulse response is approximately the inverse of the power spectrum of the colored noise, as estimated from the most recent noise portions received from the patterned signal detection device 16.

In accordance with a preferred embodiment of the present invention, the noise whitening filters 26 and 28 are defined with respect to the same feature sets that respectively describe the test utterance and the reference signals. Various ways to estimate and operate the filters 26 and 28 exist and depend on the type of feature set used.

For feature sets which contain the samples of the test utterance: Filter estimator 18 estimates an Infinite Impulse Response (IIR) or a Finite Impulse Response (FIR) filter. The latter is typically a moving average filter whose coefficients are estimated by LPC analysis of the noise signal. The IIR or FIR is then applied to the samples of the test utterance.

For feature sets which contain power spectrum samples or filter bank energy samples: Filter estimator 18 estimates the inverse of the average power spectrum of the noise signal. The filter operates by multiplying the test utterance power spectrum or filter bank energy samples by the corresponding filter power spectrum values.

For feature sets which contain autocorrelation coefficients: Filter estimator 18 estimates the inverse of the average power spectrum of the noise signal and converts it to the correlation domain. The autocorrelation coefficients of the test utterance are then convolved with the filter coefficients.

For feature sets which contain cepstral coefficients: The filter estimator 18 estimates the cepstral coefficients of the noise signal. The cepstral coefficients of the noise are then subtracted from the corresponding cepstral coefficients of the test utterance. No subtraction is performed on the zeroth coefficient of the test utterance.

The filtered test and reference feature vectors are then passed separately through second stage feature extractor devices 30 and 32 respectively, which are operative to transform the filtered feature vectors to feature vectors which are appropriate for the chosen pattern matching method, as described hereinbelow.

It will be appreciated that the first and second stage feature extraction devices are chosen together to produce the features necessary for the selected pattern matching method. The two stages are necessary to enable the filter estimation to be performed with whichever feature type a designer desires, whether for reasons of computation ease or speed.

The second stage feature extraction devices 30 and 32 (one or both of them) can be absent if the respective input feature vectors are already suitable for the selected pattern matching method. The first stage feature extraction device 24 can be absent (provided the second stage feature extraction device 30 exists). In that case, the test vector includes speech samples.

The filtered test vectors of the test utterance and the filtered reference vectors of the entirety of reference templates are passed to a local scoring or matching unit 34, operative to calculate a score between the filtered test feature vectors and each of the corresponding filtered reference feature vectors. For speech or speaker recognition tasks, the unit 34 also receives data from a boundary detector 35 which indicates the beginning and ending points of speech in the test utterance. Any frames, or vectors, of the test utterance which are outside of the beginning and ending points of speech will not be utilized in the scoring of unit 34.

The boundary detector 35 receives the test utterance from the patterned signal detection device 16 and determines the beginning and ending points usually via inspection of the energy contained in the patterned signal. Suitable boundary detectors 35 are described in the following articles which is incorporated herein by reference:

L. Lamel, L. Rabiner, A. Rosenberg and J. Wilpon, "An Improved Endpoint Detector for Isolated Word Recognition," *IEEE Transactions on Acoustics, Speech and Signal Processing*, ASSP-29, pp. 777–785, 1981.

The local scoring unit 34 typically uses a local distortion measure which is robust to white noise. Example local distortion measures are WLR and projection distortion measures as described in the previously mentioned article by D. Mansour and B. H. Juang, which article is incorporated herein by reference.

The output of unit 34 is a set of local similarity scores where each score indicates the similarity between a frame of the test utterance and single frames of each one of the reference templates.

The set of local scores is then provided to a decision procedure 36, described hereinbelow, for determining the index, code or symbol of the reference template to whom the test utterance best matches. These indices, codes or symbols are the overall output of the matching procedure.

For speech or speaker recognition systems, the decision is global in the sense that it is based on the local scores of many test feature vectors or frames. This is necessary so as to match a number of frames which make up an uttered word. Thus, the global score is typically carried out using a standard Dynamic Time Warping (DTW) procedure on the local scores, described in the following article, incorporated herein by reference:

H. Sakoe and S. Chiba, "Dynamic Programming Optimization for Spoken Word Recognition", *IEEE Transactions on Acoustics, Speech and Signal Processing*, Vol. ASSP-26, pp. 43–49, February 1978.

For Vector Quantization (VQ) methods, the decision is local in the sense that for each filtered test vector of the test utterance, the filtered reference feature vector which best matches it is provided. By "best match" it is meant that the local distortion between the filtered test vector and the filtered reference feature vector is minimal. The output of the match is the index of the best matched reference vector.

It will be appreciated that for VQ methods, the collection of reference templates is known in the art as a "codebook".

For speech recognition, the process can also be performed via Hidden Markov Modeling (HMM) or DTW-VQ in two stages. The first stage is the VQ method described above operating on the test and reference vectors and providing symbols representing the test and reference vectors. The second stage is a scoring stage. For DTW-VQ methods, the local scoring is between symbols. A global score, providing a score for a group of reference symbols forming a reference word, is then calculated on the local scores via DTW.

For scoring via HMM, a model of a word is first built from the symbols and the global score is then calculated between models using the Viterby algorithm or the forward-backward algorithm. Both algorithms are described in the article by L. R. Rabiner, "A Tutorial on Hidden Markov Models and Selected Applications in Speech Recognition", *Proceedings of the IEEE*, Vol. 77, pp. 257–285, February 1989, which article is incorporated herein by reference.

For recognition of continuous or connected speech the output of unit 34 is a series of indices of the reference words recognized in the input speech.

Figure 2:
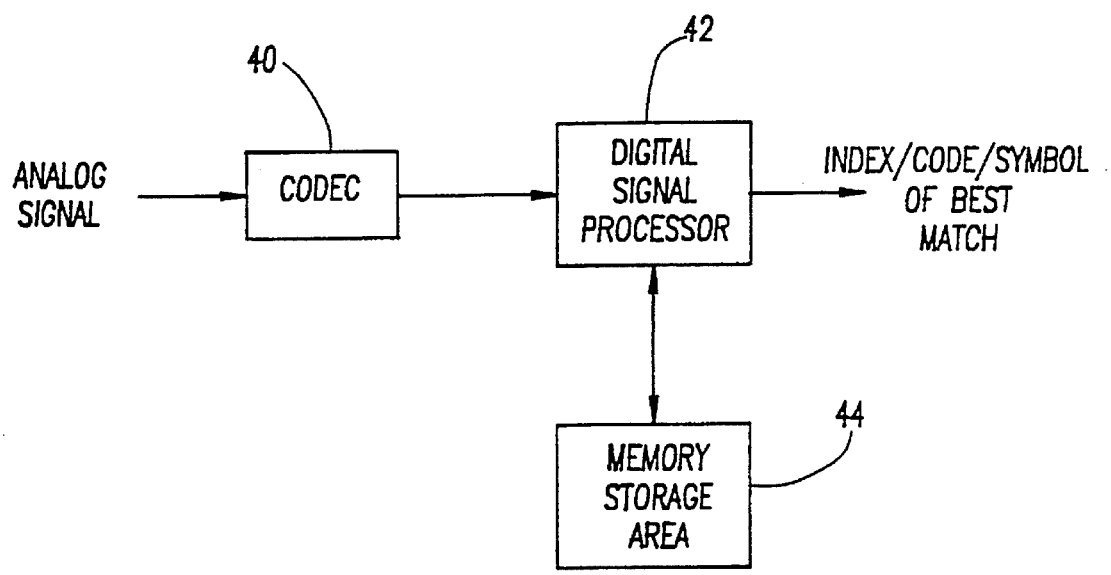
FIG. 2 is a schematic block diagram illustration of the hardware implementing the pattern matching system of FIG. 1.

Reference is now made to FIG. 2 which shows a schematic block diagram of the architecture implementing the system of FIG. 1.

A user codec 40, such as an Intel 2913, from Intel Corporation, receives the analog signal from the input device 10 and interfaces with digital signal processing circuitry 42, typically a TMS 320C25 from Texas Instruments Corporation.

A memory storage area 44, which typically includes a static random-access memory such as a 32K by 8 bit memory with an access time of 100 nsec, is connected to the digital signal processing circuitry 42 by means of a standard address data and read-write control bus.

The operations of FIG. 1 are typically carried out by software run on the digital signal processing circuitry 42. The VOX of unit 16 is typically incorporated in software run on the digital signal processing circuitry 42. It will be appreciated by persons skilled in the art that the present invention is not limited to what has been particularly shown and described hereinabove. Rather, the scope of the present invention is defined only by the claims that follow:

We claim:

1. A system for matching an input signal, comprising non-white noise and a patterned signal corrupted by said non-white noise, to a plurality of reference signals, said system comprising:

an estimator estimating noise features of said non-white noise and producing from said noise features at least one noise whitening filter;

a filter filtering said input signal and said plurality of reference signals using said at least one noise whitening filter and producing a filtered input signal, having a white noise component, and a plurality of filtered reference signals; and a pattern matcher for matching said filtered input signal to one of said filtered reference signals.

2. System according to claim 1 and wherein said at least one noise whitening filter is two noise whitening filters respectively for filtering the input signal and the reference signals.

3. System according to claim 1 including an extractor extracting features of said input signal and said reference signals and wherein said filter operates in a feature domain.

4. System according to claim 3 and wherein said feature domains are selected from the group of data samples, Linear Prediction Coefficients, cepstral coefficients, power spectrum samples, and filter bank energies.

5. System according to claim 4 and wherein said estimator estimates a filter in accordance with the selected feature domain.

6. System according to claim 1 and wherein a feature domain of the input signal is different than a feature domain of the reference signals.

7. System according to claim 6 and wherein said feature domains are selected from the group of data samples, Linear Prediction Coefficients, cepstral coefficients, power spectrum samples, and filter bank energies.

8. System according to claim 1 and wherein the pattern matcher performs a pattern matching technique selected from the group of Dynamic Time Warping DTW, Hidden Markov Models HMM, or Dynamic Time Warping-Vector Quantization DTW-VQ.

9. System according to claim 1 and wherein the input signal is a speech signal.

10. System according to claim 1 and wherein said non-white noise is the noise from the environment of a movable vehicle.

11. System according to claim 1 and wherein said non-white noise is the noise from the environment of a moving airplane cockpit.

12. System according to claim 1 and wherein said non-white noise is the noise from the environment of a vibrating machine.

13. Speech recognition system for recognizing words found in a speech signal corrupted by non-white noise, said system comprising:

an estimator estimating noise features of said non-white noise and for producing from said noise features at least one noise whitening filter;

a filter filtering said speech signal and a plurality of reference signals of selected spoken words, said filter using said at least one noise whitening filter and producing a filtered speech signal and a plurality of filtered reference signals; and a pattern matcher for matching said filtered speech signal to one of said filtered reference signals thereby recognizing the word in said speech signal.

14. Speech recognition system for recognizing a word found in a speech signal corrupted by non-white noise, said system comprising:

a vector quantization system according to claim 10 producing vector quantized speech; and a word matcher receiving a plurality of reference sequences of symbols relating to said reference signals and a test sequence of symbols relating to said speech signal for matching said test sequence to said reference sequences thereby to recognize said word in said speech signal.

15. A speech recognition system according to claim 14 wherein said word matcher performs Dynamic Time Warping (DTW) on said vector quantized speech.

16. A speaker verification system using the system of claim 15 wherein said reference signals comprises at least one word spoken by one speaker.

17. A speech recognition system according to claim 14 wherein said word matcher performs Hidden Markov Modeling (HMM).

18. A speaker verification system using the system of claim 17 wherein said reference signals comprises at least one word spoken by one speaker.

19. A speaker recognition system using the system of claim 14 wherein said reference signals comprise one word spoken by a plurality of different speakers.

20. A speaker verification system using the system of claim 14 wherein said reference signals comprises at least one word spoken by one speaker.

21. A speaker recognition system using the system of claim 13 wherein said reference signals comprise one word spoken by a plurality of different speakers.

22. A speaker verification system using the system of claim 13 wherein said reference signals comprises at least one word spoken by one speaker.

23. A Vector Quantization (VQ) system for vector quantizing a speech signal corrupted by non-white noise into a sequence of symbols, said system comprising:

an estimator estimating noise features of said non-white noise and for producing from said noise features at least one noise whitening filter;

a filter filtering segments of said speech signal and a plurality of numbered reference signals of selected speech segments, said filter using said at least one noise whitening filter and producing filtered speech segments and a plurality of filtered reference segments; and a pattern matcher for matching each of said filtered speech segments to one of said filtered reference segments and for providing as an output a symbol which is an index of the matched reference segment.

24. A speaker recognition system using the system of claim 23 wherein said reference signals comprise one word spoken by a plurality of different speakers.

25. A speaker verification system using the system of claim 23 wherein said reference signals comprises at least one word spoken by one speaker.

26. A method for matching an input signal, comprising non-white noise and a patterned signal corrupted by said non-white noise, to a plurality of reference signals, said method comprising the steps of:

estimating noise features of said non-white noise and producing from said noise features at least one noise whitening filter;

filtering said input signal and said plurality of reference signals using said at least one noise whitening filter and producing a filtered input signal, having a white noise component, and a plurality of filtered reference signals; and matching said filtered input signal to one of said filtered reference signals.

27. A method according to claim 26 and wherein said at least one noise whitening filter is two noise whitening filters respectively for filtering the input signal and the reference signals.

28. A method according to claim 26 including the steps of extracting features of said input signal and said reference signals and wherein said step of filtering occurs in a feature domain.

29. A method according to claim 28 and wherein said feature domains are selected from the group of data samples, Linear Prediction Coefficients, cepstral coefficients, power spectrum samples, and filter bank energies.

30. A method according to claim 28 and wherein said step of estimating estimates a filter in accordance with the selected feature domain.

31. A method according to claim 26 and wherein a feature domain of the input signal is different than a feature domain of the reference signals.

32. A method according to claim 26 and wherein said step of matching performs a pattern matching technique selected from the group of Dynamic Time Warping DTW, Hidden Markov Models HMM, or Dynamic Time Warping-Vector Quantization DTW-VQ.

33. A method according to claim 26 and wherein the input signal is a speech signal.

\* \* \* \* \*